(12) United States Patent
You

(10) Patent No.: US 10,911,082 B2
(45) Date of Patent: Feb. 2, 2021

(54) INTEGRATED KARAOKE DEVICE

(71) Applicant: SHENZHEN TEANA TECHNOLOGY CO., LTD., Guangdong (CN)

(72) Inventor: Guangguo You, Shenzhen (CN)

(73) Assignee: Shenzhen Teana Technology Co., Ltd., Shenzhen (CN)

( * ) Notice: Subject to any disclaimer, the term of this patent is extended or adjusted under 35 U.S.C. 154(b) by 11 days.

(21) Appl. No.: 15/540,447

(22) PCT Filed: Feb. 25, 2016

(86) PCT No.: PCT/CN2016/074565
§ 371 (c)(1),
(2) Date: Jun. 28, 2017

(87) PCT Pub. No.: WO2017/133032
PCT Pub. Date: Aug. 10, 2017

(65) Prior Publication Data
US 2018/0332387 A1 Nov. 15, 2018

(30) Foreign Application Priority Data
Feb. 6, 2016 (CN) .......................... 2016 1 0083818

(51) Int. Cl.
*H04B 1/08* (2006.01)
*H04B 1/20* (2006.01)
(Continued)

(52) U.S. Cl.
CPC ................. *H04B 1/08* (2013.01); *H04B 1/20* (2013.01); *H04R 1/403* (2013.01); *H04R 1/04* (2013.01); *H04R 1/083* (2013.01)

(58) Field of Classification Search
CPC ....................................................... H04B 1/08
(Continued)

(56) References Cited

U.S. PATENT DOCUMENTS

| 1,403,811 A | 1/1922 | Pauly |
| 2,218,389 A | 10/1940 | Warmbier |

(Continued)

FOREIGN PATENT DOCUMENTS

| CN | 1457620 | 11/2003 |
| CN | 101331793 A | 12/2008 |

(Continued)

OTHER PUBLICATIONS

International Search Report and Written Opinion prepared by the Chinese Intellectual Property Office dated Oct. 11, 2016, for International Application No. PCT/CN2016/074565.

(Continued)

*Primary Examiner* — Kesha Frisby
(74) *Attorney, Agent, or Firm* — Sheridan Ross P.C.

(57) ABSTRACT

The present invention discloses an integrated karaoke device, which comprises a control unit, a main sound chamber and a microphone assembly connected to the main sound chamber. At least two symmetrically arranged speakers are provided within the main sound chamber. The microphone assembly comprises a microphone and a microphone holder. The microphone holder is made of a soft material. The microphone and the speakers are respectively electrically connected with the control unit. The present invention has the following advantageous effect: the symmetrical arrangement of the plurality of speakers within the sound chamber allows the sound vibrations generated by the plurality of speakers to cancel each other out, such that the vibrations are prevented from being transmitted to the microphone.

18 Claims, 2 Drawing Sheets

(51) Int. Cl.
   *H04R 1/40* (2006.01)
   *H04R 1/04* (2006.01)
   *H04R 1/08* (2006.01)

(58) Field of Classification Search
   USPC .................................................. 434/307 A
   See application file for complete search history.

(56) References Cited

U.S. PATENT DOCUMENTS

| | | | |
|---|---|---|---|
| 3,890,474 | A | 6/1975 | Glicksberg |
| 5,208,717 | A | 5/1993 | Takao |
| 5,349,480 | A | 9/1994 | Takao |
| 6,947,566 | B2 | 9/2005 | Mears |
| 8,243,951 | B2 | 8/2012 | Ishibashi et al. |
| 10,504,497 | B2 | 12/2019 | You |
| 2006/0217066 | A1 | 9/2006 | Giammaria et al. |
| 2006/0228683 | A1 | 10/2006 | Jianping |

FOREIGN PATENT DOCUMENTS

| | | |
|---|---|---|
| CN | 202035121 | 11/2011 |
| CN | 102972043 | 3/2013 |
| CN | 204272340 U | 4/2015 |
| CN | 204291297 U | 4/2015 |
| JP | H10-228228 | 8/1998 |
| JP | 2003-108184 | 4/2003 |
| KR | 200382291 | 4/2005 |
| KR | 100764728 | 10/2007 |
| KR | 1726815 | 4/2017 |

OTHER PUBLICATIONS

International Search Report and Written Opinion for International (PCT) Patent Application No. PCT/CN2014/092367, dated Aug. 14, 2015, 5 pages.
Official Action for U.S. Appl. No. 15/520,389, dated Mar. 14, 2019, 16 pages.
Notice of Allowance for U.S. Appl. No. 15/520,369, dated Jul. 24, 2019, 8 pages.
Official Action for U.S. Appl. No. 16/709,730, dated Apr. 3, 2020, 4 pages.

INTEGRATED KARAOKE DEVICE

CROSS REFERENCE TO RELATED APPLICATIONS

This application is a national stage application under 35 U.S.C. 371 and claims the benefit of PCT Application No. PCT/CN2016/074565 having an international filing date of 25 Feb. 2016, which designated the United States, which PCT application claimed the benefit of Chinese Patent Application No. 201610083818.3 filed 6 Feb. 2016, the disclosure of each of which are incorporated herein by reference.

TECHNICAL FIELD

The present invention relates to the field of audio playback; and in particular relates to an integrated karaoke device.

BACKGROUND ART

Karaoke technology and the application thereof are mature and widely utilized. However, the availability of portable, simplified karaoke equipment is currently very limited, while individual karaoke products are even less available. The foregoing devices are typically used only in certain professional locations or in some fixed places, and are thus very inconvenient. On the other hand, there are a wide variety of different microphones, including the type of microphones with a reverb function, currently available on the market. These microphones are currently widely used as independent microphone products that must be connected to an external speaker or other devices for use.

Moreover, a speaker will generate, along with sound, a vibration at the same frequency as the sound. As a result, when a microphone and a speaker are made into one integrated unit or are located very close to each other, the sound inputted to the microphone is then amplified by the speaker and transmitted back to the microphone via the shell. This sound at the same frequency will be inputted to the microphone again, and then re-amplified. The foregoing process repeats many times and, accordingly, generates an intensive self-feedback effect, in other words, a self-excited effect. As a result, the speaker will output a continuous and ever enhanced sound at the same frequency (commonly known as whistle), which completely prevents the normal use of the integrated karaoke device.

Certainly, there are some currently available products that are able to alter the frequency of the sound, so that the frequency or phase of the inputted sound is different from the frequency or phase of the outputted sound. In this way, the whistle can be avoided. Alternatively, some devices are able to remove certain specific frequency points, etc. by way of certain practical design or calculation and filtering, which is also able to eliminate the whistle issue. However, the foregoing approaches can seriously distort the sound, and hence cannot meet the requirement for good sound quality.

Therefore, it becomes many people's aspiration to have a single device with a combined microphone and speaker, which is small and portable and can provide a direct karaoke effect without compromising sound quality, and even improving sound quality. Such a device would allow people to enjoy karaoke singing or karaoke music at any time, anywhere.

SUMMARY OF THE INVENTION

The present invention intends to solve the technical problem described above, addressing the deficiencies in the currently available technology in the field and providing an integrated karaoke device.

The present invention employs the following technical solution to solve the foregoing technical problem.

The present invention provides an integrated karaoke device. One embodiment of the integrated karaoke device comprises a control unit, a main sound chamber and a microphone assembly connected to the main sound chamber. At least two symmetrically arranged speakers are provided within the main sound chamber. The microphone assembly comprises a microphone and a microphone holder. The microphone holder is made of a soft material. The microphone and the speakers are respectively electrically connected with the control unit.

In the integrated karaoke device according to some embodiments of the present invention, the main sound chamber is a hollow column structure with at least two symmetrically arranged openings therein. Each of the speakers is connected to a corresponding opening and is sealedly connected to the opening.

In the integrated karaoke device according to some embodiments of the present invention, each of the openings is connected to a speaker cylinder, and speakers are fixed on the corresponding speaker cylinders.

In the integrated karaoke device according to some embodiments of the present invention, the speaker cylinders are covered with a protective case.

In the integrated karaoke device according to some embodiments of the present invention, the connection point between the microphone and the main sound chamber is located within a distance of 0 to 20 cm from a plane or axis of symmetry of the two or plurality of speakers.

In the integrated karaoke device according to some embodiments of the present invention, the microphone holder is formed of a material selected from the group consisting of silicone, rubber, TPU and soft plastic.

In the integrated karaoke device according to some embodiments of the present invention, the microphone assembly further comprises a fixation base and a net head, wherein the fixation base is fixed on an outer side wall of the main sound chamber; the net head covers the microphone and is fixedly connected with the main sound chamber.

In the integrated karaoke device according to some embodiments of the present invention, the device further comprises a connecting rod, wherein the connecting rod is connected on an outer side wall of the main sound chamber.

In the integrated karaoke device according to some embodiments of the present invention, the control unit is fixed on an outer side wall of the main sound chamber, and a switch assembly is connected to the control unit.

In the integrated karaoke device according to some embodiments of the present invention, a panel is connected to an outer side wall of the main sound chamber.

In summary, embodiments of the present invention provide an integrated karaoke device, which has the following advantageous effects: First, a plurality of speakers have been symmetrically arranged within the sound chamber, so that the sound vibrations generated by the plurality of speakers can cancel each other out, such that the vibrations are prevented from being transmitted to the microphone. Second, the distance between the axis of the microphone and the central line of the two or plurality of speakers is within the range of from 0 to 20 mm, which is able to effectively prevent whistle generation. Third, the microphone holder is made of a soft material, which can effectively reduce sound vibration, thus greatly inhibiting the sound vibration generated from speakers from being transmitted to the microphone.

BRIEF DESCRIPTION OF DRAWINGS

The present invention will be further described in detail with reference to the accompanying drawings. In the drawings.

DESCRIPTION OF EMBODIMENTS

The present invention will now be described in further detail with reference to the accompanying drawings and embodiments of the present invention, in which the objects and advantages of embodiments of the present invention will become more apparent. It is to be understood that the specific embodiments described herein are merely illustrative of the present invention and are not intended to limit the present invention.

Figure 1:
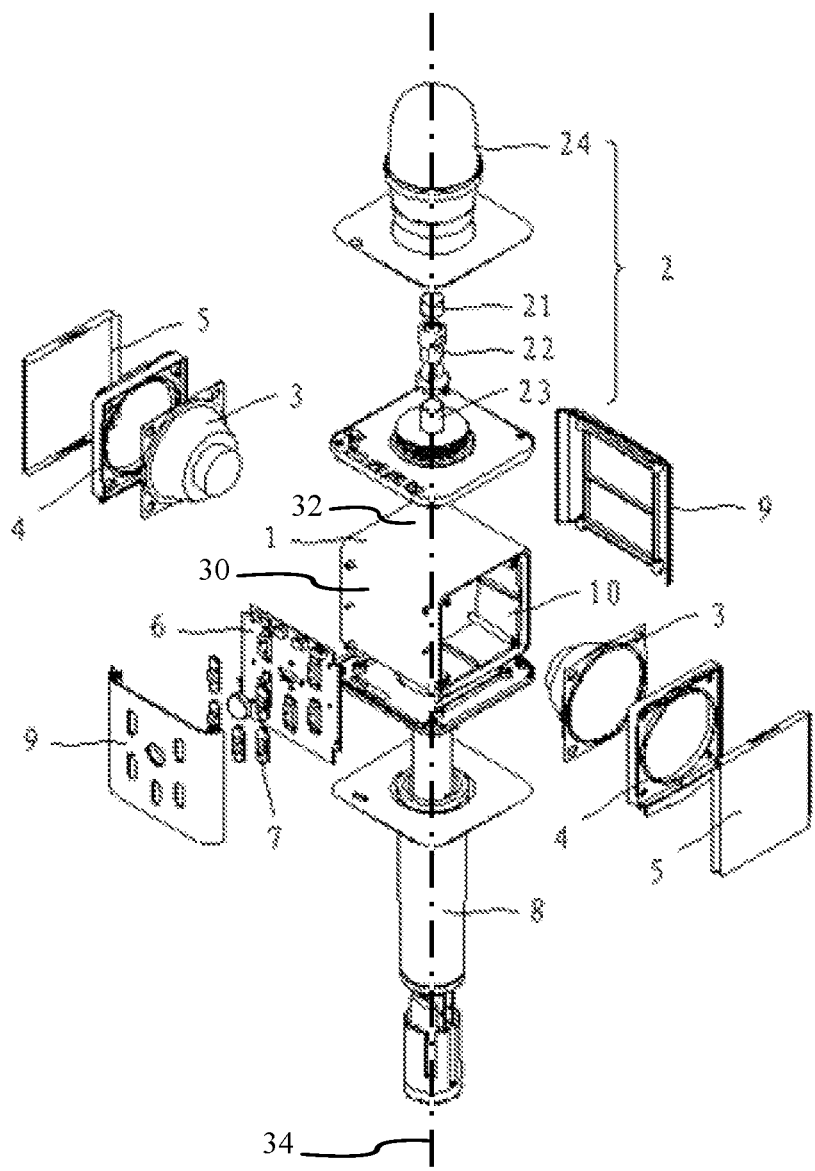
FIG. 1 is an exploded view of the integrated karaoke device provided in one embodiment of the present invention.

As shown in FIG. 1, an embodiment of the present invention provides an integrated karaoke device. The device comprises a control unit 6, a main sound chamber 1 and a microphone assembly 2 connected to the main sound chamber 1. At least two symmetrically arranged speakers 3 are provided within the main sound chamber 1. The microphone assembly 2 comprises a microphone 21 and a microphone holder 22. The microphone holder 22 is made of a soft material. The microphone 21 and the speakers 3 are respectively electrically connected with the control unit 6.

Figure 2:
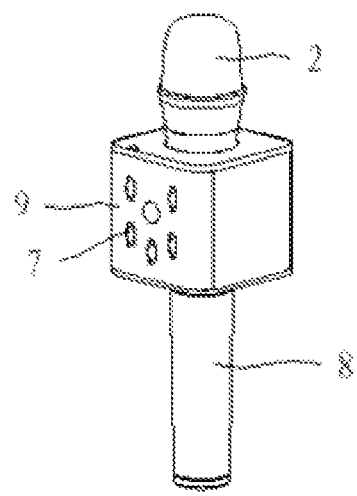
FIG. 2 is a schematic view of the integrated karaoke device shown in FIG. 1.

In this embodiment, there are two speakers 3. The two speakers 3 are arranged opposite to each other within the main sound chamber 1. Specifically, the main sound chamber 1 is a hollow column structure, and more specifically is a hollow cuboid structure. At least two symmetrically arranged openings 10 are provided on the outer side wall 30 of the main sound chamber 1 and are respectively in communication with the hollow interior of the main sound chamber 1. Each of the two speakers 3 is connected to a corresponding opening 10 and is sealedly connected to the corresponding opening 10. It is to be understood that in this embodiment, the number of the openings 10 corresponds to the number of the speakers 3. For example, the karaoke device depicted in FIGS. 1 and 2 has two speakers 3, and therefore the main sound chamber 1 has two openings 10. A karaoke device according to an embodiment of the present invention having four speakers 3 would require a main sound chamber 1 with four openings 10. Moreover, when the speakers 3 are respectively connected to the openings 10, the speakers 3 and the main sound chamber 1 form a sealed chamber.

When in use, sound and vibration are transmitted to the microphone 21 via two pathways. One pathway of sound wave transmission is through air. The other pathway of sound wave transmission to the microphone 21 is through certain solid components. The intensity of the sound wave transmitted through air is not high, while the sound and vibration transmitted through a solid component can be very strong. The transmission of sound and vibration through solid components frequently generates a strong self-feedback effect, or in other words, a self-excitation effect (the same sound frequency being continuously amplified). When this happens, a speaker 3 will generate a continuous and ever enhanced sound at a fixed frequency, which is commonly known as whistle. This whistle completely prevents normal use of the device.

Due to the fact that sound is a kind of wave generated and transmitted through vibration, it is fundamentally a force of vibration. When a loudspeaker (namely a speaker 3) generates a sound, its diaphragm vibrates forward and backward at a specific frequency, and this vibration then pushes local air or other medium to vibrate, thus transmitting the original vibration (and the corresponding sound) through the local air or other medium. In this context, if there is only one speaker 3 in the main sound chamber 1, the speaker 3 will drive the entire main sound chamber 1 and any component that is connected to the main sound chamber 1 to vibrate at the same frequency. When the microphone is located in a certain position, the vibration will be transmitted to the microphone 21, and the the sound self-excitation effect, or in other words, the whistle, will be generated accordingly.

On the other hand, if the vibration at a certain location is reduced or even eliminated, the whistle can be avoided. In the present application, the vibration is canceled by virtue of a mechanism of phase offset. Specifically, two speakers 3 with exactly the same specification and the same performance are respectively arranged on two sides of the main sound chamber 1, which are arranged in opposing directions. When a sound at a specific frequency is generated, the sounds generated by the two speakers have the same phase, same amplitude, and same frequency, but move in opposite directions. As a result, when the two vibration waves meet in a medium, they will cancel each other out, or at least reduce each other.

In one embodiment of the present invention, by way of arranging two speakers 3 symmetrically in the main sound chamber 1, the vibrations generated by the two speakers 3 will cancel each other out. By virtue of this phase offset mechanism, the whistle can be avoided. It is understood that the present embodiment does not limit the numbers of speakers 3 provided in the main sound chamber 1. A plurality of speakers 3 can be arranged therein, provided that the plurality of speakers 3 are evenly arranged within the main sound chamber 1. According to the phase offset mechanism described above, not only two speakers, but also multiple other speakers 3 can be arranged to utilize the same phase offset mechanism. When the speakers are evenly arranged in the chamber, the vibration at the location of the plane or axis of symmetry of the speakers 3 can be reduced or eliminated, and accordingly, the sound feedback effect is avoided. For example, in embodiments of the present invention having three speakers 3, the three speakers 3 are evenly arranged within the main sound chamber 1 by 120°. In addition, three openings 10 are provided on an outer side wall 30 of the main sound chamber 1, and the three openings 10 are also evenly arranged on the main sound chamber 1 by 120°. Each speaker 3 is arranged at the location of a corresponding opening 10, and is sealedly connected with the corresponding opening 10.

The present embodiment does not limit the direction of the speakers 4. For example, the the speakers 3 may be arranged to face the center of the main sound chamber 1. In such embodiments, because the speakers 3 face the center of the main sound chamber 1, the sound can be transmitted to the outside easily by providing a sound hole (not shown) on the main sound chamber 1.

Speaker cylinders 4 and protection cases 5 can be further provided on the main sound chamber 1. The speaker cylinders 4 mainly function to secure the speakers and seal the main sound chamber 1. The protection cases 5 function to protect the speakers 3 from physical damage. In addition, they may also function for decoration. Specifically, each speaker 3 is fixed on a corresponding speaker cylinder 4, and the speaker cylinder 4 is further fixed to the main sound chamber 1. The protection cases 5 are disposed to cover the speaker cylinders 4, respectively.

The speakers 3 and the speaker cylinders 4, the speaker cylinders 4 and the main sound chamber 1, and the protection cases 5 and the main sound chamber 1 can be fixedly connected via a threaded approach or a snapping approach. However, the connections between them are not limited to these two ways, and other connecting or fastening mechanisms may be used.

The microphone assembly 2 mainly comprises a microphone 21, a microphone holder 22, a fixation base 23, a net head 24, and a longitudinal axis 34 (also called an "axis of the microphone" herein). The microphone 21 is fixed on the microphone holder 22. The microphone holder 22 is connected to the main sound chamber 1 via the fixation base 23. The fixation base 23 is positioned on an upper surface 32 of the outer side wall 30. The net head 24 is provided to cover the microphone 21 and is fixedly connected to the main sound chamber 1.

In order to effectively prevent the whistle effect, the connection point between the microphone 21 and the main sound chamber 1 is located with a distance of 0 to 20 cm from a plane or axis of symmetry between the two speakers 3. Alternatively, the connection point between the microphone 21 and the main sound chamber 1 is located with a distance of 0 to 20 cm from a plane or axis of symmetry of the plurality of speakers 3. Preferably, the connection point between the microphone 21 and the main sound chamber 1 is located with a zero distance from the plane or axis of symmetry between the two speakers 3, that is to say, the location of the connection point between the microphone 21 and the main sound chamber 1 overlaps with the plane or axis of symmetry of the two speakers 3 or plurality of speakers 3. In this case, the best inhibitory effect on whistle is obtained.

Thus, the speakers 3 are symmetrically arranged on two sides of the main sound chamber 1. The connection point between the microphone 21 and the main sound chamber 1 is located exactly on the plane or axis of symmetry of the two speakers 3. (A closer location of the connection point between the microphone 21 and the main sound chamber 1 with respect to the symmetry axis will result in a smaller vibration generated by the speakers 3.) As a result, the vibration generated by the sound is completely eliminated at the location of the plane or axis of symmetry, rather than being transmitted to the microphone 21. In this way, the sound of the speakers 3 will not be transmitted to the microphone 21. As a result, the sound self-feedback effect will not be generated.

In order to further reduce the sound vibration transmitted from a solid component to the microphone 21, the microphone holder 22 may be made of a soft material. The microphone holder 22 formed by a soft material can effectively reduce sound vibration, such that the sound vibration generated by the speakers 3 is inhibited from transmission to the microphone 21.

The microphone holder 22 is preferably made of silicone. Silicone has a relatively low hardness and accordingly can effectively reduce the vibration. It is understood that the microphone holder 22 may also be made of another soft material, for example, rubber, TPU and the like. In addition, a soft plastic material with a hardness below 80 may also be used in the present application. As along as the hardness of a material is sufficiently low, it can function to reduce vibration.

Preferably, the microphone holder 22 may be in the form of an arched structure, a hollow structure or a spring structure. However, it is noted that it may be in another form, and the specific form is not limited in the present invention. Moreover, the arched structure of the microphone holder 22 formed by a soft material is able to prevent a small vibration caused by an error, which can further reduce the vibration and ensure that the sound generated from the speakers 3 will not be transmitted to the microphone 21. Accordingly, the sound self-feedback effect will not occur.

The fixation base 23 is fixed on the main sound chamber 1. The microphone holder 22 is fixed on the fixation base 23. The microphone holder 22 may be connected to the fixation base 23 via threads; alternatively, it can be connected to the fixation base 23 via insertion. Moreover, the fixation base 23 may be fixed on the main sound chamber 1 via bonding, such as with gel or glue. Further, the fixation base 23 may also be fixed on the main sound chamber 1 via bonding or threads, or may be integrally formed with the main sound chamber 1.

The net head 24 covers the microphone holder 22. It functions to protect the microphone 21 from any physical damage. In addition, the net head 24 plays a role in filtering the human voice, as well as in decoration, so as to improve the aesthetic effect of the microphone.

The control unit 6 is fixed on a side wall of the main sound chamber 1. The microphone 21 and the speakers 3 are respectively electrically connected to the control unit 6. In addition, the control unit 6 is also connected with a switch assembly 7, so as to control the function and switching on/off of the integrated karaoke device. The specific structures of the control unit 6 and the switch assembly 7, and the respective electrical connections, are common technical means available in the art, which will not be repeated herein.

The integrated karaoke device according to the illustrated embodiment of the present invention further comprises a connecting rod 8 and a battery assembly (not shown) that provides electric power to the device. The connecting rod 8 can function as a handle that can be easily held by a user. In the present embodiment of the present invention, the battery assembly is arranged within the connecting rod 8. The connecting rod 8 is connected to one end surface of the main sound chamber 1 opposing the microphone assembly 2, and is coaxial with the microphone 21. However, it is noted that the present invention does not limit the specific connecting position of the connecting rod 8. The connecting rod 8 may also be connected to another end surface of the main sound chamber 1.

A panel 9 is further provided on an outer side wall 30 of the main sound chamber 1. The panel protects the control unit 6 and the switch assembly 7 from physical damage. In addition, it can also play a role in product decoration.

Although the present invention has been described by way of specific embodiments, it will be apparent to those skilled in the art that various changes and equivalent replacements may be made to the present invention without departing from the scope of the present invention. In addition, various modifications may also be made to the present invention without departing from the scope of the invention regarding a particular situation or material. Accordingly, the present invention is not limited to the specific embodiments disclosed herein, but should cover all embodiments falling within the scope of the claims of the present invention.

What is claimed is:

1. An integrated karaoke device comprising:
a control unit;
a main sound chamber formed by an outer side wall, the main sound chamber having a cuboid shape;
at least two symmetrically arranged speakers positioned within the main sound chamber such that the at least two speakers are arranged an equal distance from an axis of symmetry and vibrations emitted by the at least two symmetrically arranged speakers cancel each other at the axis of symmetry; and
a microphone assembly connected to an upper portion of the outer side wall of the main sound chamber, the microphone assembly comprising a microphone, a microphone holder having an arched structure to prevent transmission of vibrations and made of a soft material to reduce vibrations, a fixation base, and a longitudinal axis, wherein the microphone is connected to the microphone holder and the microphone holder is connected to the main sound chamber via the fixation base positioned on an upper surface of the outer side wall of the main sound chamber,
wherein the microphone and the at least two symmetrically arranged speakers are electrically connected with the control unit, and
wherein the longitudinal axis of the microphone assembly and a connection point between the microphone and the main sound chamber are located on the axis of symmetry of the at least two speakers.

2. The integrated karaoke device of claim 1, wherein the main sound chamber defines a hollow interior, at least two symmetrically arranged openings are provided on the main sound chamber, and each of the at least two speakers is sealedly connected to a corresponding opening.

3. The integrated karaoke device of claim 2, wherein each of the openings is connected to a speaker cylinder, and each of the at least two speakers is fixed on the speaker cylinder of the corresponding opening.

4. The integrated karaoke device of claim 3, wherein the speaker cylinders are covered with a protective case.

5. The integrated karaoke device of claim 1, wherein the microphone holder is formed of at least one of silicone, rubber, TPU and soft plastic.

6. The integrated karaoke device of claim 1, wherein the microphone assembly further comprises a net head covering the microphone and fixedly connected to the main sound chamber.

7. The integrated karaoke device of claim 1, further comprising a connecting rod connected to the outer side wall of the main sound chamber.

8. The integrated karaoke device of claim 1, wherein the control unit is fixed on the outer side wall of the main sound chamber, and a switch assembly is connected to the control unit.

9. The integrated karaoke device according to claim 1, characterized in that a panel is connected to the outer side wall of the main sound chamber and positioned over the control unit.

10. An integrated karaoke device, comprising:
a main sound chamber comprising an outer wall, the outer wall comprising at least an upper surface and a lower surface and defining a hollow interior and at least two openings;
a microphone connected to the main sound chamber at a connection point on the upper surface of the outer wall, such that the microphone is not positioned in the main sound chamber, wherein the microphone has a longitudinal axis;
at least two speakers arranged symmetrically within the main sound chamber and equally spaced from an axis of symmetry of the main sound chamber such that vibrations from each of the at least two speakers cancel each other, each of the at least two speakers mounted in a different one of the at least two openings; and
a control unit in electrical communication with the microphone and the at least two speakers,
wherein the connection point of the microphone and the longitudinal axis of the microphone are positioned on the axis of symmetry.

11. The integrated karaoke device of claim 10, further comprising a connecting rod extending downwardly from the lower surface of the outer wall of the main sound chamber.

12. The integrated karaoke device of claim 11, wherein the connecting rod comprises a battery assembly.

13. The integrated karaoke device of claim 10, wherein the microphone is mounted to the upper surface of the outer wall of the main sound chamber by way of a microphone holder and a fixation base, the microphone holder made of at least one of silicone, rubber, TPU, and soft plastic.

14. The integrated karaoke device of claim 10, wherein the outer wall comprises at least one side surface, and further wherein the control unit is mounted to the at least one side surface.

15. A karaoke device, comprising:
a main sound chamber having a cuboid shape with a top surface, a bottom surface, two side surfaces, and two open ends, the main sound chamber having a hollow interior;
a microphone connected to the top surface of the main sound chamber via a silicone microphone holder having an arched structure to prevent transmission of vibrations and a fixation base such that the microphone is positioned outside of the main sound chamber;
two speakers symmetrically arranged within the main sound chamber, each speaker positioned at one of the two open ends; and
a control unit in electrical communication with the microphone and the two speakers, the control unit mounted to one of the two side surfaces.

16. The karaoke device of claim 15, further comprising a net head positioned around the microphone to protect the microphone from physical damage.

17. The karaoke device of claim 15, wherein the microphone is connected to the silicone microphone holder and the silicone microphone holder is connected to the fixation base.

18. The karaoke device of claim 15, further comprising a connecting rod extending downwardly from the bottom surface and comprising a battery assembly, the battery assembly in selective electrical communication with the control unit.

* * * * *